US012304214B2

(12) United States Patent
Yoshikawa et al.

(10) Patent No.: US 12,304,214 B2

(45) Date of Patent: May 20, 2025

(54) PRINTING APPARATUS AND INK QUANTITY DETECTION METHOD THEREOF

(71) Applicant: CANON KABUSHIKI KAISHA, Tokyo (JP)

(72) Inventors: Hirokazu Yoshikawa, Yokohama (JP); Kei Kosaka, Tokyo (JP); Tetsuya Narazaki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/747,377

(22) Filed: May 18, 2022

(65) Prior Publication Data

US 2022/0274418 A1 Sep. 1, 2022

Related U.S. Application Data

(63) Continuation of application No. 16/832,046, filed on Mar. 27, 2020, now Pat. No. 11,351,794.

(30) Foreign Application Priority Data

Apr. 5, 2019 (JP) ................................ 2019-073081

(51) Int. Cl.

*B41J 2/175* (2006.01)
*B41J 29/13* (2006.01)
*B41J 29/38* (2006.01)

(52) U.S. Cl.

CPC ....... *B41J 2/17566* (2013.01); *B41J 2/17513* (2013.01); *B41J 2/17546* (2013.01);

(Continued)

(58) Field of Classification Search

CPC . B41J 2/17566; B41J 2/17513; B41J 2/17546

See application file for complete search history.

(56) References Cited

U.S. PATENT DOCUMENTS 6,022,102 A 2/2000 Ikkatai et al.
6,520,630 B1 2/2003 Oda et al.

(Continued)

FOREIGN PATENT DOCUMENTS

CN 1515880 A 7/2004
CN 1663800 A 9/2005

(Continued)

OTHER PUBLICATIONS

Office Action dated Dec. 2, 2021, in Chinese Patent Application No. 202010256379.8.

(Continued)

*Primary Examiner* — Jason S Uhlenhake

(74) *Attorney, Agent, or Firm* — Venable LLP

(57) ABSTRACT

A printing apparatus counts an ink quantity in an ink tank in accordance with consumption of ink from the ink tank, updates and holds a count value obtained by the count in a counter, and detects whether ink injection to the ink tank has been done before execution of sensing by a sensing unit configured to sense whether a predetermined quantity of ink is present in the ink tank. If sensing by the sensing unit is executed, the apparatus reads out a preceding sensing result from a memory that stores a sensing result of presence/absence of the ink by the sensing unit, verifies a transition between the preceding sensing result and a current sensing result, and controls operations of reset of the count value held by the counter and the count based on the transition and a result of the detection.

12 Claims, 10 Drawing Sheets

(52) U.S. Cl.
CPC ............... *B41J 29/13* (2013.01); *B41J 29/38* (2013.01); *B41J 2002/17569* (2013.01)

(56) References Cited

U.S. PATENT DOCUMENTS

| | | | | |
|---|---|---|---|---|
| 6,536,861 | B1 | 3/2003 | Usui et al. | |
| 6,793,305 | B2 | 9/2004 | Tsukada et al. | |
| 7,101,012 | B2 | 9/2006 | Kosugi et al. | |
| 7,556,363 | B2 | 7/2009 | Yamamoto | |
| 8,371,673 | B2 | 2/2013 | Maru et al. | |
| 9,233,550 | B2 | 1/2016 | Aida | |
| 9,415,601 | B1 | 8/2016 | Tsukida | |
| 9,561,658 | B2 | 2/2017 | Danzuka et al. | |
| 9,573,380 | B2 | 2/2017 | Ishida et al. | |
| 9,770,916 | B2 | 9/2017 | Koganehira et al. | |
| 9,994,037 | B2 | 6/2018 | Sakai | |
| 10,271,116 | B2 * | 4/2019 | Davis | G01F 23/00 |
| 10,445,029 | B2 | 10/2019 | Yamada | |
| 10,569,560 | B2 | 2/2020 | Wada et al. | |
| 10,618,293 | B2 | 4/2020 | Koshikawa et al. | |
| 2002/0186293 | A1 * | 12/2002 | Ando | B41J 2/17509 347/109 |
| 2003/0025742 | A1 * | 2/2003 | Maeda | B41J 2/17513 347/7 |
| 2005/0195231 | A1 * | 9/2005 | Kasamatsu | B41J 2/17566 347/14 |
| 2007/0064028 | A1 * | 3/2007 | Jung | B41J 2/17566 347/7 |
| 2008/0055374 | A1 | 3/2008 | Yahiro | |
| 2009/0295849 | A1 | 12/2009 | Ito | |
| 2013/0307897 | A1 * | 11/2013 | Watanabe | B41J 29/13 347/19 |
| 2016/0279962 | A1 | 9/2016 | Ishida et al. | |
| 2016/0279963 | A1 * | 9/2016 | Koganehira | B41J 29/13 |
| 2016/0350637 | A1 | 12/2016 | Kawana | |
| 2017/0120617 | A1 * | 5/2017 | Matsumura | B41J 29/38 |
| 2017/0187900 | A1 * | 6/2017 | Koganehira | B41J 2/17509 |
| 2018/0272722 | A1 | 9/2018 | Murphy et al. | |

FOREIGN PATENT DOCUMENTS

| | | | |
|---|---|---|---|
| CN | 1704246 | A | 12/2005 |
| CN | 1796136 | A | 7/2006 |
| CN | 1872560 | A | 12/2006 |
| CN | 101293423 | A | 10/2008 |
| CN | 201211735 | Y | 3/2009 |
| CN | 202169766 | U | 3/2012 |
| CN | 104417052 | A | 3/2015 |
| CN | 104417081 | A | 3/2015 |
| CN | 105984235 | A | 10/2016 |
| CN | 105984236 | A | 10/2016 |
| CN | 106004056 | A | 10/2016 |
| CN | 107107621 | A | 8/2017 |
| CN | 108688319 | A | 10/2018 |
| JP | 10-29318 | A | 2/1998 |
| JP | 2001-187459 | A | 7/2001 |
| JP | 2007-237706 | A | 9/2007 |
| JP | 2008-055775 | A | 3/2008 |
| JP | 2010-061694 | A | 3/2010 |
| JP | 2010-247485 | A | 11/2010 |
| JP | 2013-166344 | A | 8/2013 |
| JP | 2014-159106 | A | 9/2014 |
| JP | 2015-178280 | A | 10/2015 |
| JP | 2016-129975 | A | 7/2016 |
| JP | 2016-179677 | A | 10/2016 |
| JP | 2016-203991 | A | 12/2016 |
| JP | 2017-140701 | A | 8/2017 |
| JP | 2018-032194 | A | 3/2018 |
| JP | 2019-028756 | A | 2/2019 |
| JP | 2019-093669 | A | 6/2019 |
| WO | 2015/114814 | A1 | 8/2015 |

OTHER PUBLICATIONS

Office Action dated Mar. 3, 2023, in Japanese Patent Application No. 2019-073081.
Office Action dated May 25, 2023, in Chinese Patent Application No. 202211129405.6.
Office Action dated May 20, 2023, in Chinese Patent Application No. 202211129569.9.
Chinese Notification of Decision to Grant Patent Right, dated May 16, 2024 for Chinese Patent Publication No. 2022-11129405.6 (8 pages).
Japanese Office Action, dated Jun. 3, 2024, for Japanese Patent Publication No. 2023-185010 (6 pages).
Office Action dated Mar. 15, 2024, in Japanese Patent Application No. 2023-185010.
Office Action dated Dec. 21, 2023, in Chinese Patent Application No. 202211129405.6.
Office Action dated Sep. 6, 2024 in Japanese Patent Application No. 2023-185010.

* cited by examiner

PRINTING APPARATUS AND INK QUANTITY DETECTION METHOD THEREOF

BACKGROUND OF THE INVENTION

Field of the Invention

The present invention relates to a printing apparatus and an ink quantity detection method thereof, and particularly to a printing apparatus configured to perform printing by discharging ink from a printhead in accordance with, for example, an inkjet method, and an ink quantity detection method thereof.

DESCRIPTION OF THE RELATED ART

Conventionally, for an inkjet printing apparatus (to be referred to as a printing apparatus hereinafter) including a refillable inktank (or ink tank) that a user can inject with ink via an inlet port, there has been proposed an arrangement for detecting, using a sensor in the inktank, whether a predetermined ink quantity is present in the inktank.

For example, Japanese Patent Laid-Open No. 2016-179677 discloses a printing apparatus having the following arrangement. That is, the printing apparatus includes a calculation unit configured to calculate an ink consumption quantity, a storage unit configured to store a count value updated based on the ink consumption quantity calculated by the calculation unit, and a pair of electrodes configured to detect whether ink is present at a predetermined position in an inktank. A control unit measures a voltage across the pair of electrodes, thereby detecting the presence/absence of ink. Upon judging, before the count value is returned to an initial value, that the ink is present, the control unit controls to return the count value to the initial value.

However, the printing apparatus described in Japanese Patent Laid-Open No. 2016-179677 has the following problem. That is, if air in the inktank expands/contracts due to a change in the atmospheric pressure or temperature in the inktank, an ink liquid surface level changes, and the sensor reacts to the change, although the actual ink quantity does not change. As a result, an error occurs in the count value updated based on the ink consumption quantity.

SUMMARY OF THE INVENTION

Accordingly, the present invention is conceived as a response to the above-described disadvantages of the conventional art.

For example, a printing apparatus and an ink quantity detection method thereof according to this invention are capable of accurately detecting an ink quantity in an inktank regardless of a change in an environment.

According to one aspect of the present invention, there is provided a printing apparatus including an inktank that contains ink injected from an inlet port, a printhead configured to print by discharging ink supplied from the inktank, a sensing unit configured to sense whether a predetermined quantity of ink is present in the inktank, comprising: a memory unit configured to store a sensing result by the sensing unit; a counting unit configured to count an ink quantity in the inktank in accordance with consumption of the ink from the inktank; a first counter configured to update and hold a count value by the counting unit; a verification unit configured to, if sensing by the sensing unit is executed, read out a preceding sensing result from the memory unit and verify a transition between the preceding sensing result and a current sensing result; a detection unit configured to detect whether ink injection to the inktank has been done before execution of sensing by the sensing unit; and a control unit configured to control operations of reset of the count value held by the first counter and count by the counting unit based on the transition obtained by the verification unit and a result of detection by the detection unit.

According to another aspect of the present invention, there is provided an ink quantity detection method of a printing apparatus including an inktank that contains ink injected from an inlet port, a printhead configured to print by discharging ink supplied from the inktank, and a sensing unit configured to sense whether a predetermined quantity of ink is present in the inktank, comprising: counting an ink quantity in the inktank in accordance with consumption of the ink from the inktank; updating and holding a count value obtained by the counting in a counter; detecting whether ink injection to the inktank has been done before execution of sensing by the sensing unit; if sensing by the sensing unit is executed, reading out a preceding sensing result from a memory that stores a sensing result of presence/absence of the ink by the sensing unit and verifying a transition between the preceding sensing result and a current sensing result; and controlling operations of reset of the count value held by the counter and the count based on the transition obtained in the verifying and a result of detection in the detecting.

According to still another aspect of the present invention, there is provided a printing apparatus comprising: a printhead configured to discharge ink; an inktank configured to contain ink to be supplied to the printhead and including an inlet port from which the ink is injected; a cover configured to cover the inlet port; an open/close detection unit configured to detect open/close of the cover; a detection unit configured to detect whether a predetermined quantity of ink contained in the inktank is present; a memory configured to store a preceding detection result by the detection unit; and a notification unit configured to notify a status of the apparatus, wherein if the preceding detection result by the detection unit is absence, and a current detection result is presence, the notification unit notifies that an ink quantity has increased in a case where the open/close detection unit detects that the cover is closed, and the notification by the notification unit is not made in a case where the open/close detection unit does not detect that the cover is closed.

The invention is particularly advantageous since the transition of a change between preceding ink presence/absence detection and current ink presence/absence detection is taken into consideration, it is possible to suppress an error between an actual ink quantity and a count value, and accurately grasp the ink quantity in an inktank.

Further features of the present invention will become apparent from the following description of exemplary embodiments (with reference to the attached drawings).

DESCRIPTION OF THE EMBODIMENTS

Figure 1:
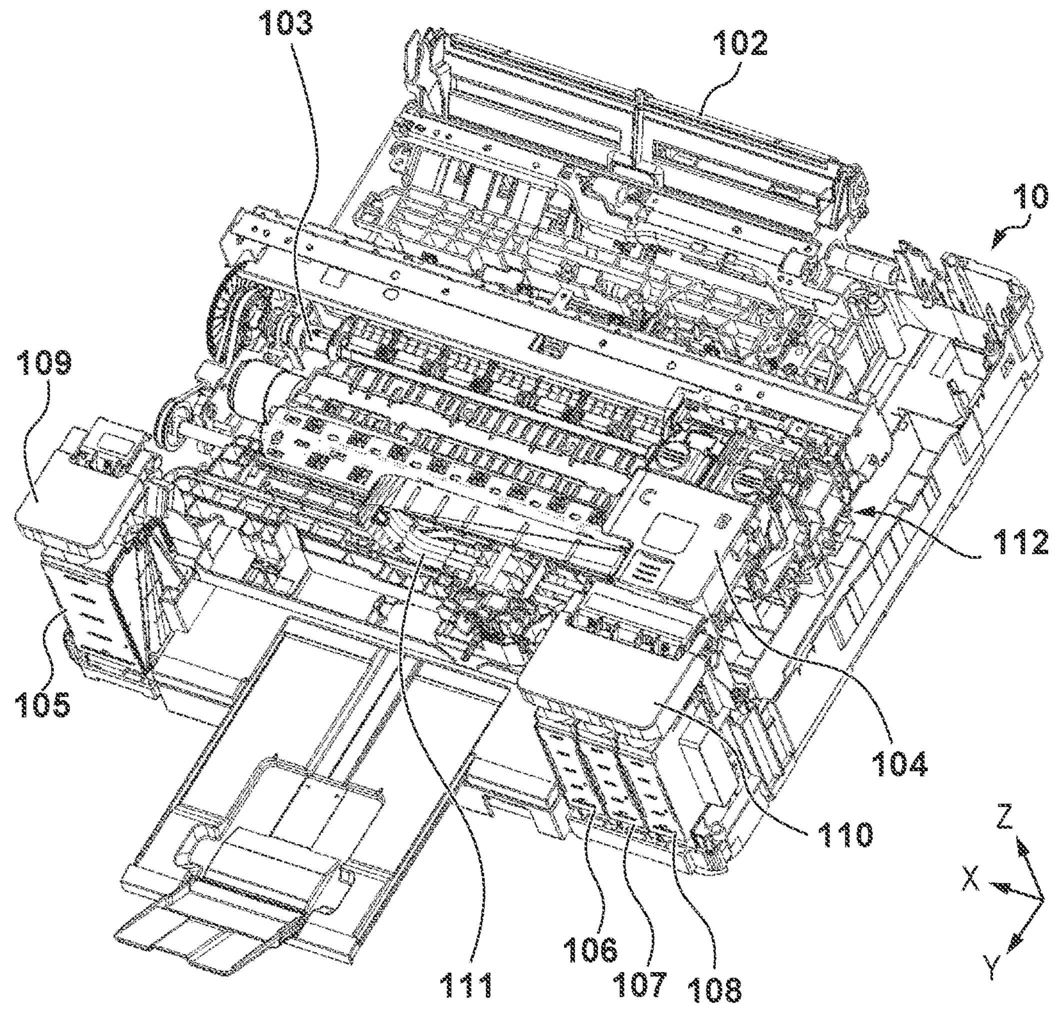
FIG. 1 is a perspective view showing the schematic arrangement of a printing apparatus including an inkjet printhead according to an exemplary embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle" (to be also referred to as "print element" hereinafter) generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Description of Outline of Printing Apparatus (FIGS. 1 to 4)>

FIG. 1 is a perspective view showing the outline of the mechanism of a printing apparatus 10 that performs printing using an inkjet printhead (to be referred to as a printhead hereinafter) according to an exemplary embodiment of the present invention. As shown in FIG. 1, the printing apparatus 10 includes a printhead (not shown) detachably mounted on a carriage 104 and configured to discharge ink, a supply tube 111 configured to supply the ink to the printhead, and an inktank that contains the ink.

As the inktank, the printing apparatus 10 includes four inktanks, that is, an inktank 105 that contains black ink, an inktank 106 that contains cyan ink, an inktank 107 that contains magenta ink, and an inktank 108 that contains yellow ink. The printing apparatus 10 also includes a first cover 109 that covers the inktank 105, and a second cover 110 that covers the inktanks 106, 107, and 108. The carriage 104 is supported to be reciprocally movable in an X direction along a guide rail installed in the printing apparatus 10. When performing printing on a print medium, the carriage 104 reciprocally moves in a print region via a carriage belt (not shown) driven by a carriage motor (not shown).

In addition, the printing apparatus 10 includes a feeding unit 102 that feeds a print medium, a conveyance unit 103 that conveys the print medium in a Y direction orthogonal to the X direction, and a recovery mechanism 112 that performs a recovery operation to maintain the ink discharge performance of the printhead to hold the quality of a printed image. The recovery mechanism 112 is arranged outside the print region and inside the moving region of the carriage 104.

Note that the printhead mounted on the carriage is a printhead according to an inkjet method of discharging ink using thermal energy, and includes a plurality of electrothermal transducers configured to generate the thermal energy. According to this method, thermal energy is generated by a pulse signal applied to the electrothermal transducers, film boiling is caused in ink by the thermal energy, and ink is discharged from orifices using the bubbling pressure of film boiling, thereby performing printing.

Figure 2A:
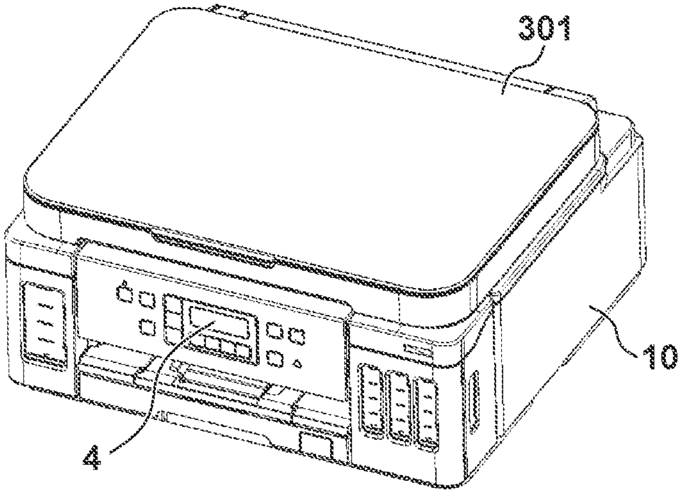
FIGS. 2A, 2B, and 2C are perspective views showing the outline of the internal mechanism of the printing apparatus shown in FIG. 1.
Figure 2B:
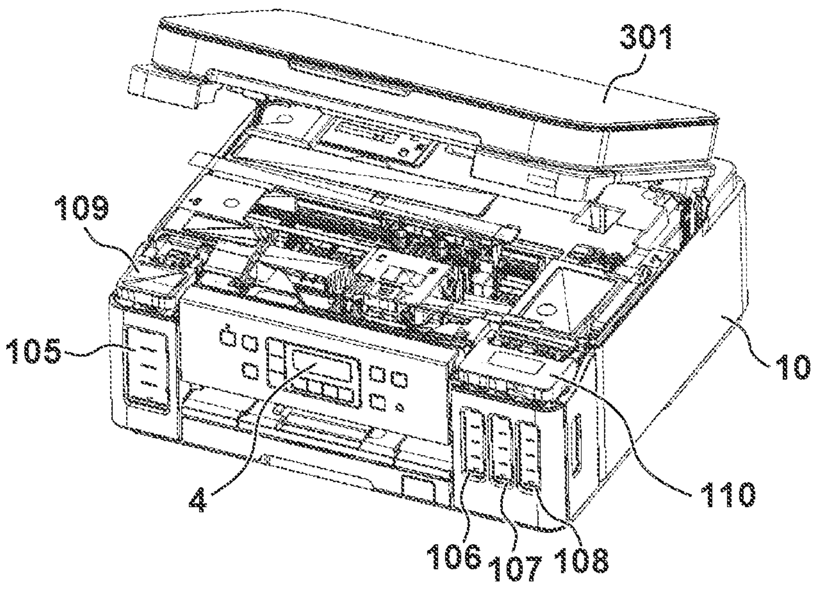
Figure 2C:
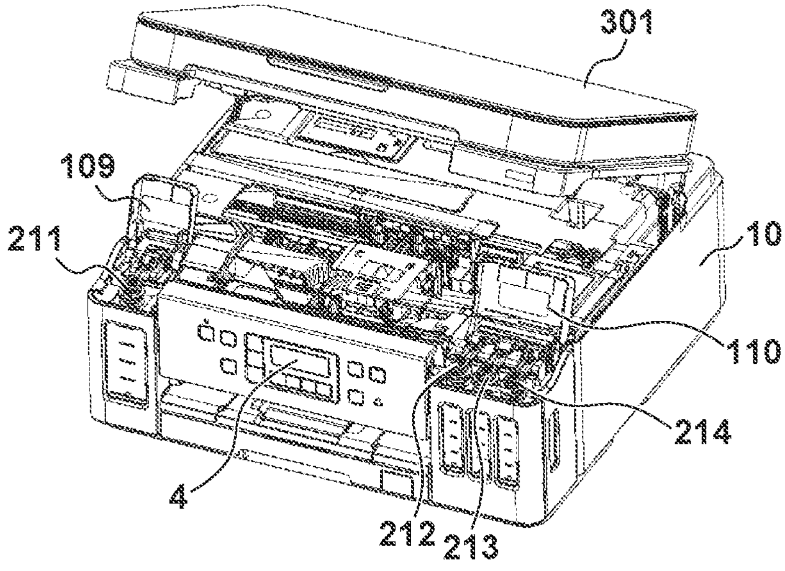

FIGS. 2A to 2C are external perspective views of the printing apparatus including the same internal mechanism as shown in FIG. 1.

FIG. 2A shows a state in which the printing apparatus 10 is provided with an access cover 301 in which a scanner unit including a read unit (ADF) capable of reading images of stacked originals is mounted. The access cover 301 is axially supported to be opened/closed with respect to the main body of the printing apparatus 10. The printing apparatus 10 includes, on the front surface, an operation unit 4 on which the user can perform an operation such as instruction input to the printing apparatus 10. The operation unit 4 includes a display panel capable of displaying an error in the printing apparatus 10 or the ink quantity in the inktank 105. FIG. 2B shows a state when the access cover 301 is opened, and the user injects ink. The access cover 301 is synchronized with an open/close sensing sensor (not shown) configured to sense the open/close of the access cover 301. When the user opens the access cover 301, the sensor reacts and determines that ink can be injected. FIG. 2C shows a state in which the first cover 109 that covers an inktank cap 211 of the inktank 105, and the second cover 110 that covers a cap 212 of the inktank 106, a cap 213 of the inktank 107, and a cap 214 of the inktank 108 are provided. That is, the second cover 110 integrally covers the caps provided on the plurality of inktanks. Note that the access cover 301 in which the scanner unit is not mounted is also possible.

When injecting ink into the inktank, the user needs to perform an operation of raising (opening) the first cover 109 and the second cover 110, as shown in FIG. 2C. The user can inject ink by detaching the cap of each inktank.

Figure 3:
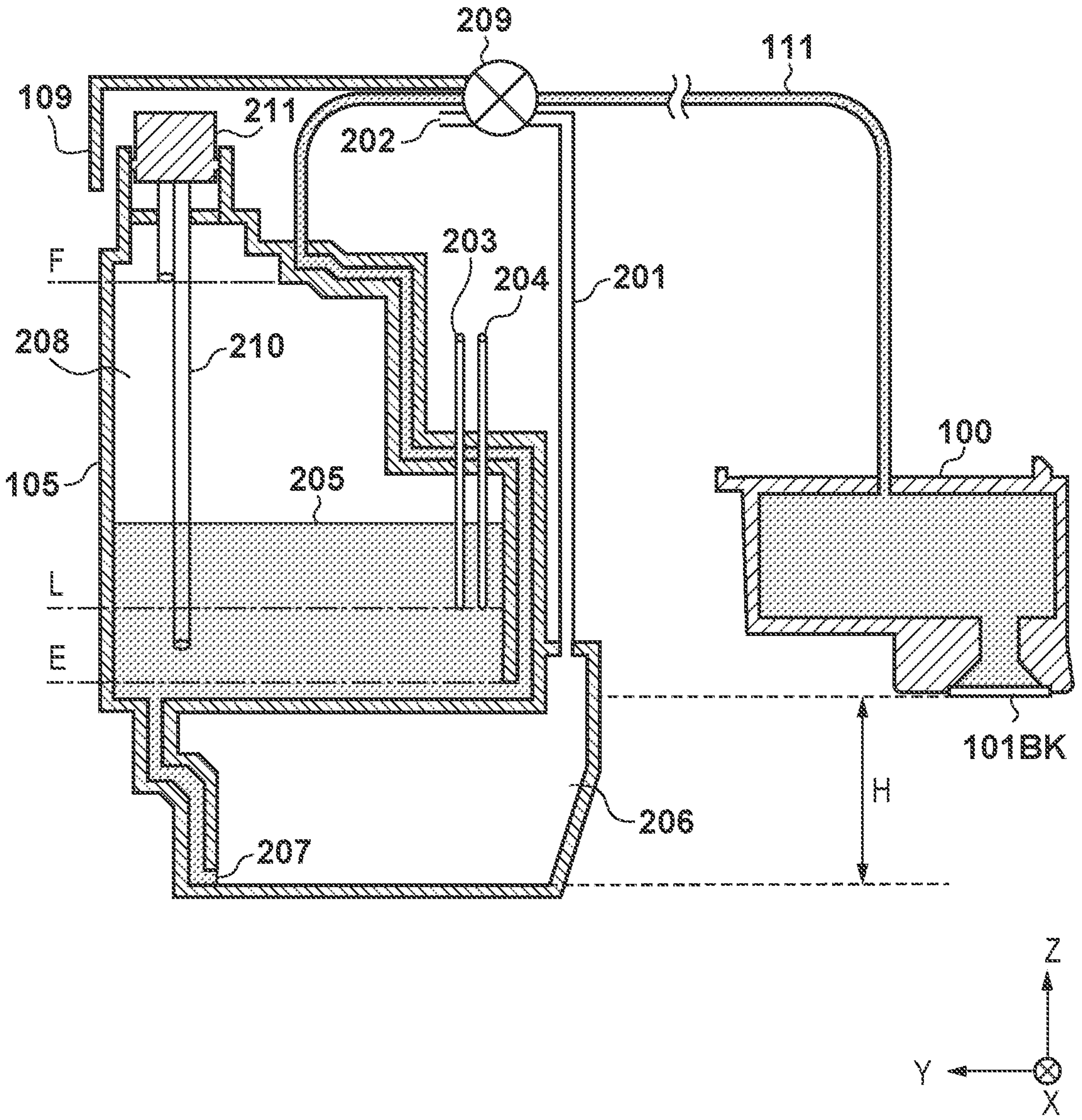
FIG. 3 is a sectional view schematically showing an example of the ink supply system of the printing apparatus shown in FIG. 1.

FIG. 3 is a sectional view schematically showing the structure of the main part of the ink supply system of the printing apparatus. A description will be made here using an example applied to black ink (BK), and the same structure is assumed to be provided for the remaining inks.

As shown in FIG. 3, a printhead 100 communicates, via the supply tube 111, with the inktank 105 that contains black ink. The inktank 105 contains black ink inside, and an air communication tube 201 that forms an air communication path connected to an air communication port 202 configured to make the inside communicate with air is attached to the inktank 105. The supply tube 111 and the air communication tube 201 are made of a flexible material such as elastomer. An ink filling port 210 configured to inject ink is provided in the upper portion of the inktank 105. In addition, the tank cap 211 used to seal the inlet port is attached to the ink filling port 210. Furthermore, the first cover 109 that covers the tank cap 211 is attached.

A valve unit 209 that blocks communication of ink and air is provided on the supply tube 111 and the air communication tube 201. The valve unit 209 is interlocked with the first cover 109. When the user opens the first cover 109, a closed state in which the supply tube 111 and the air communication tube 201 are closed (blocked) is obtained. When the user removes the tank cap 211, it is possible to inject ink from the ink filling port 210 into the inktank 105. To the contrary, when the user closes the first cover 109, the valve unit 209 is set in an open state, and the supply tube 111 and the air communication tube 201 are opened.

As the black ink is consumed from an orifice array 101BK formed from a plurality of orifices configured to discharge the black ink, an ink liquid surface 205 in the inktank 105 lowers. Two electrodes 203 and 204 used to detect the ink residual quantity are provided in the inktank 105. These electrodes are also called residual detection pins. A voltage value obtained by supplying a weak current across the two electrodes is detected, and the voltage value is A/D-converted to obtain a digital value. It is detected based on the digital value, whether the ink liquid surface 205 in the inktank 105 is located under a vertical-direction (Z-direction) position indicated by L in FIG. 3. Note that the position L shown in FIG. 3 corresponds to the position of the lower ends of the two electrodes 203 and 204.

More specifically, in a case in which the ink liquid surface 205 in the inktank 105 is located at the same position as the position L or above it, when a weak current is supplied across the two electrodes 203 and 204, the current flows via the ink. Hence, the detected voltage value at that time is low, and the digital value is small. On the other hand, in a case in which the ink liquid surface 205 in the inktank 105 is located under the position L, no current flows across the two electrodes 203 and 204 via the ink. Hence, the detected voltage value at that time of weak current supply is high, and the obtained digital value is large.

In this way, it is possible to detect whether the ink liquid surface 205 in the inktank 105 is located under the position L. That is, with this arrangement, it is possible to detect whether the ink quantity contained in the inktank 105 is less than a predetermined quantity. Such a detection operation will be referred to as an ink residual quantity detection or residual detection hereinafter. The sensing result will also be referred to as a residual sensing result. In addition, the position L will also be referred to as a residual detection position.

The position L is set at a height from a position E defined such that the ink residual quantity becomes equal to/more than “a quantity consumed by a recovery operation (refresh operation) to fill the supply tube 111 and the printhead 100 with the ink”. For this reason, if the ink liquid surface 205 is at a position under the position L, and the ink residual quantity is determined to be less than the ink consumption quantity in the refresh operation, the recovery operation cannot be executed. However, a printing operation or a recovery operation whose ink consumption quantity is less than that in the refresh operation can be executed.

In addition, the position E is a height defined such that the ink residual quantity becomes equal to/more than a minimum ink quantity needed to prevent air from entering from a gas-liquid replacement portion 207 of the inktank 105 into an ink supply channel when consuming the ink. If the ink is continuously supplied in a state in which the ink in the inktank 105 is absent, air is mixed into the ink supply channel including the supply tube 111. When the air enters the printhead 100 via the supply tube 111 and reaches the orifice 101BK, the ink cannot be discharged, and a discharge failure occurs.

To prevent this, in this embodiment, the ink residual quantity located under the position L is managed by a counter that counts the ink consumption quantity, and when the counter reaches a threshold, an operation concerning ink consumption such as a printing operation or a recovery operation is paused. In this case, when the user performs ink injection such that the ink liquid surface 205 is located above the position L, or the user cancels the pause at any desired timing, the printing operation or the recovery operation can be resumed.

Additionally, in the printing apparatus 10, to prevent the ink from leaking from the orifice 101BK of the printhead 100, the gas-liquid replacement portion 207 of the inktank 105 is provided at a position lower than the orifice 101BK of the printhead 100 by a height H in the vertical direction (Z direction). That is, an arrangement for applying a negative pressure by a head difference corresponding to the height H to the orifice 101BK is employed. Note that the gas-liquid replacement portion 207 is formed with an opening area that keeps the meniscus of ink. In addition, a buffer chamber 206 is provided under the inktank 105. The buffer chamber 206 can contain the ink that is pushed out when air in an ink containing chamber 208 containing ink expands due to an atmospheric pressure variation, a temperature change, or the like and breaks the meniscus in the gas-liquid replacement portion 207. This prevents the ink from leaking from the inktank 105 via the tube 201 of the air communication path.

Figure 4A:
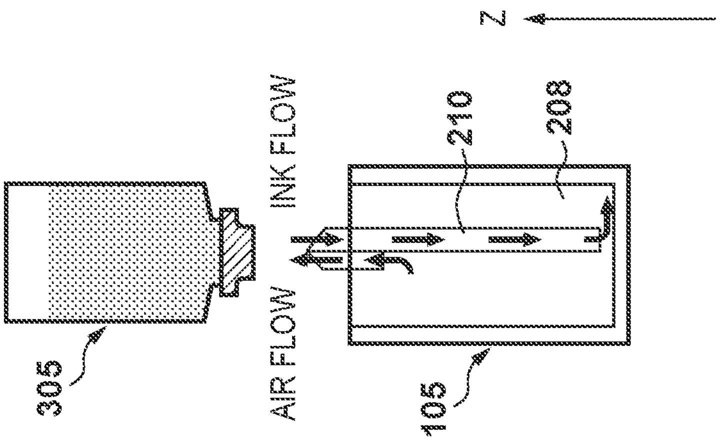
FIGS. 4A, 4B, and 4C are sectional views schematically showing an example of ink injection of the printing apparatus shown in FIG. 1.
Figure 4B:
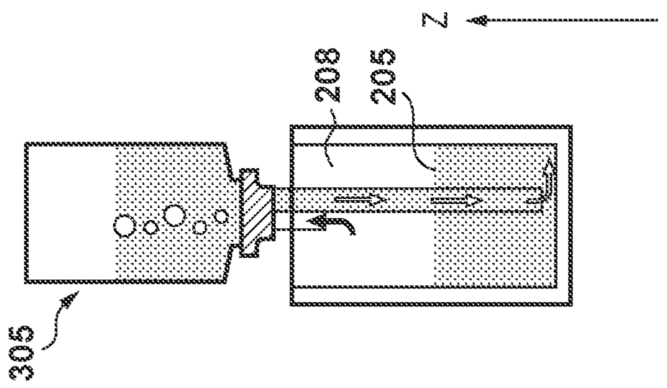
Figure 4C:
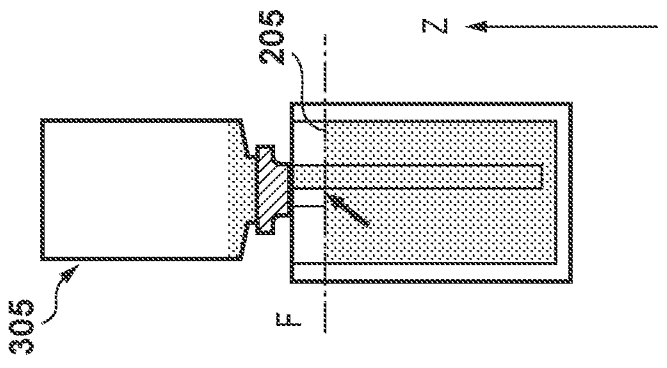

FIGS. 4A to 4C are sectional views schematically showing an operation of injecting ink into the inktank.

A description will be made here using an example applied to black ink (BK), and the same structure is assumed to be provided for the remaining inks.

As shown in FIG. 4A, the ink filling port 210 is divided into two channels, that is, an ink inlet path and an air outlet path. As shown in FIG. 4B, when an ink bottle 305 with black ink is inserted, the ink in the ink bottle 305 flows into the ink containing chamber 208 via the ink inlet path. In addition, air in the ink containing chamber 208 flows out to the ink bottle 305 via the air outlet path. That is, the ink is supplied to the inktank 105 by gas-liquid replacement that replaces the air in the ink containing chamber 208 of the inktank 105 with the black ink in the ink bottle 305. When ink injection progresses, the port of the air outlet path is closed by the ink liquid surface 205, as shown in FIG. 4C. Hence, the air cannot flow out from the inktank 105 to the ink bottle 305, and gas-liquid replacement stops. For this reason, when the ink liquid surface 205 reaches a position F in the vertical direction (Z direction), ink injection automatically stops, and an ink filled-up state is obtained. Note that the position F is indicated by an alternate long and short dashed line in FIG. 3 as well.

A structure in which the inktank is fixed to the printing apparatus, and ink is supplied via the tube has been described above as an example. However, the embodiment can also be applied to a so-called on-carriage structure in which an inktank is mounted on a carriage together with a printhead. That is, the ink filling port may be provided in the inktank mounted on the carriage, and the user may inject ink from the inktank.

Figure 5:
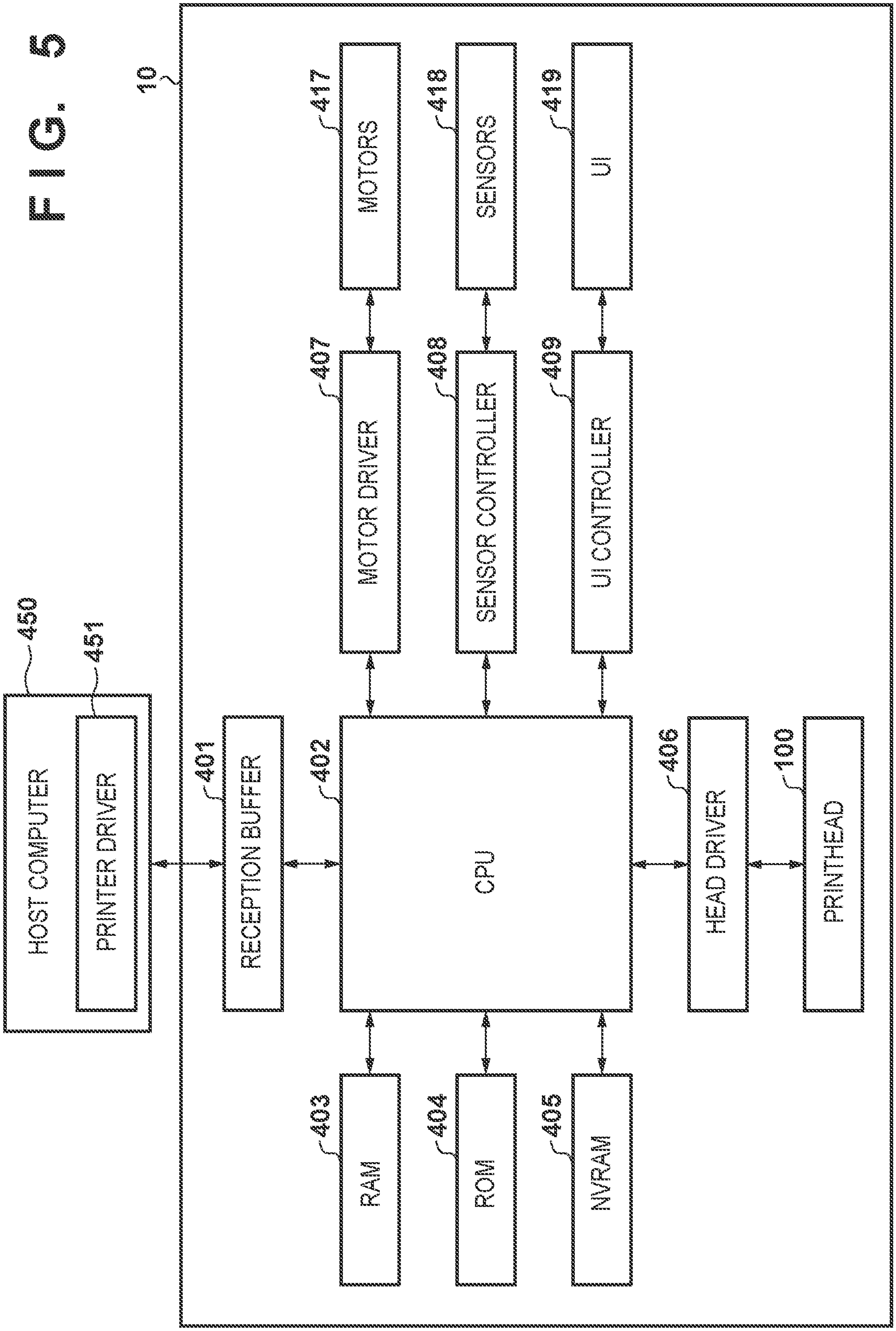
FIG. 5 is a block diagram showing the control configuration of the printing apparatus shown in FIG. 1.

FIG. 5 is a block diagram showing the control configuration of the printing apparatus shown in FIG. 1.

Referring to FIG. 5, a host computer (to be referred to as a host hereinafter) 450 is an information processing apparatus such as a PC or a portable device, and for example, is connected from a PC to the printing apparatus 10 via a USB interface or the like. A printer driver 451 is software installed in the host 450, and corresponds to various functions and specifications provided in the printing apparatus 10. The printer driver 451 generates print data based on a user-desired document or image data of a photo or the like in accordance with a print instruction by the user, and transmits the print data to the printing apparatus 10.

A reception buffer 401 is a buffer configured to hold print data or the like transmitted from the host 450 to the printing apparatus 10. The print data or the like held in the reception buffer 401 is transferred to a RAM 403 by a CPU 402 and temporarily stored.

The printing apparatus 10 includes a counter that counts an ink quantity consumed by a recovery operation or discharge from an orifice array based on a recovery consumption quantity or a value obtained by multiplying the number of discharged ink droplets by a volume per droplet. The CPU 402 also executes count of the number of ink discharges by the counter or control based on the count value.

In addition, a ROM 404 stores programs, fixed data, and the like necessary for various kinds of control of the printing apparatus 10. An NVRAM 405 is a non-volatile memory configured to store information that should be held even if the printing apparatus 10 is powered off. The count value obtained by the counter is written and saved into the NVRAM 405 at a timing such as every time a print medium is discharged, after a cleaning sequence, or after soft-off.

A head driver 406 is a driver configured to drive the printhead 100. A motor driver 407 is a driver configured to drive various kinds of motors 417 such as a carriage motor, a conveyance motor, and a motor used to move the cap in the vertical direction. A sensor controller 408 is a controller configured to control the operations of various kinds of sensors 418 including the open/close sensing sensor of the access cover 301. A UI controller 409 is a controller configured to control a UI (user-interface) portion 419 of the printing apparatus 10. The UI portion 419 includes a display panel (display unit) formed by an LED or an LCD configured to display various kinds of information, and an operation unit 4 configured to accept an operation from the user. The CPU 402 executes various kinds of operations such as calculation, control, judgment, and setting in cooperation with the RAM 403, the ROM 404, the NVRAM 405, and other constituent elements.

Several embodiments of ink residual quantity detection processing executed by a printing apparatus having the above-described arrangement will be described next.

First Embodiment

Figure 6:
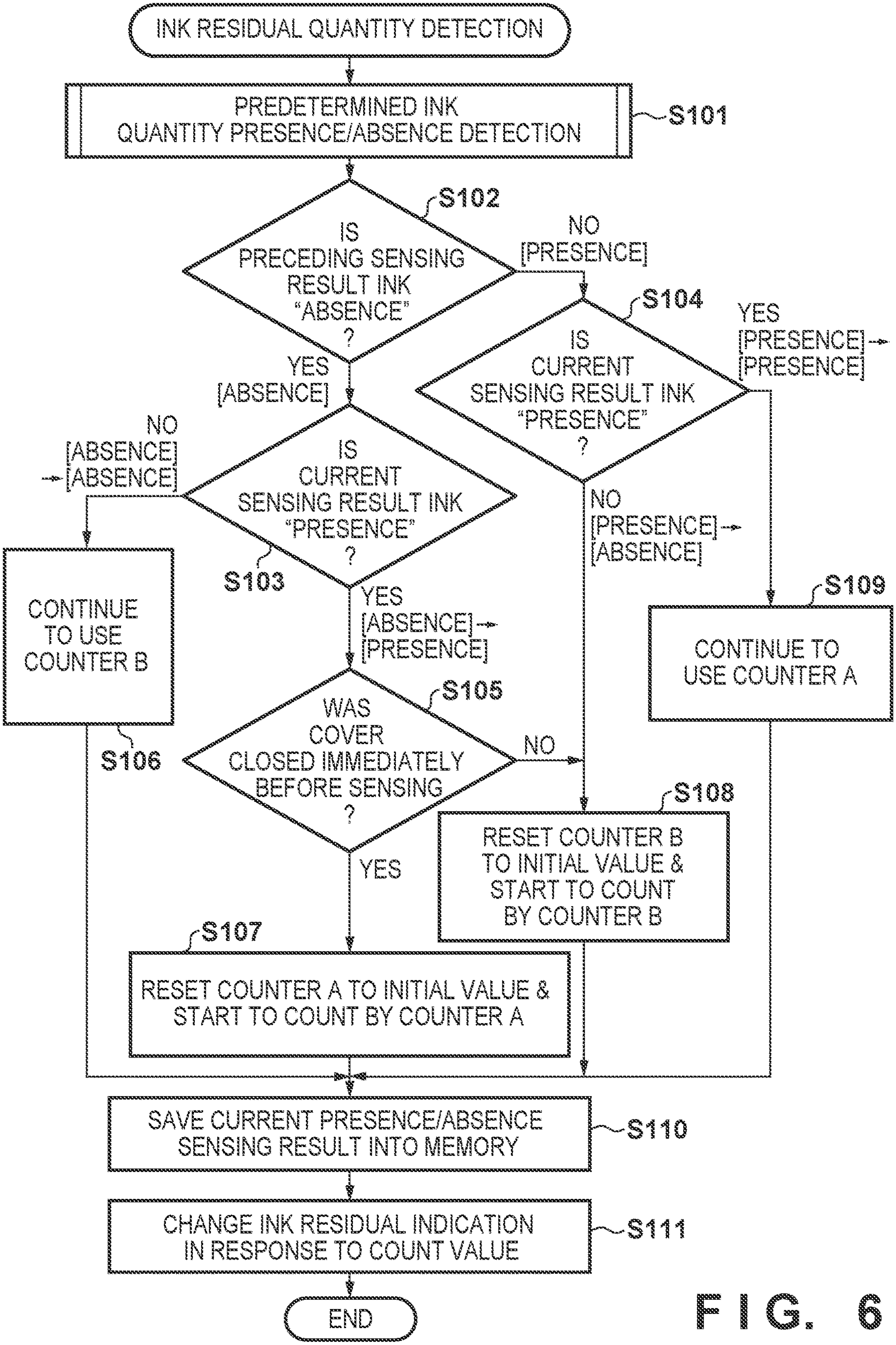
FIG. 6 is a flowchart showing ink residual quantity detection processing according to the first embodiment.

FIG. 6 is a flowchart showing processing of ink residual quantity detection according to the first embodiment. Note that since the structure of the inktank, the ink supply mechanism, and ink residual detection are common to all inks, as described above, processing of only one inktank (an inktank 105 containing black ink) will be described here.

In the first embodiment, a counter A and a counter B are used as two counters in association with ink residual quantity detection. The counter A is used for count when it is determined that a predetermined ink quantity or more is “presence” in the inktank 105 until an ink liquid surface 205 is located at a position L shown in FIG. 3 in accordance with the ink consumption quantity, and it is determined that a predetermined ink quantity or more is absent. On the other hand, the counter B is used to count the ink consumption quantity when it is determined that a predetermined ink quantity or more is “absence” in the inktank 105 until the ink liquid surface 205 moves from the vicinity of the position L to the vicinity of a position E shown in FIG. 3 in accordance with the ink consumption quantity.

First, in step S101, when ink residual quantity detection starts, it is checked whether a predetermined ink quantity or more is present or absent in the inktank. This is called predetermined ink quantity presence/absence detection. Details of predetermined ink quantity presence/absence detection will be described later with reference to FIG. 7.

Next, in step S102, a preceding predetermined ink quantity presence/absence sensing result is read out from an NVRAM 405, and it is checked whether the result is “absence” (predetermined ink quantity absence). Here, if the preceding result is “absence” (YES), the process advances to step S103. If the result is “presence” (NO), the process advances to step S104. In both step S103 and step S104, it is checked whether the current predetermined ink quantity presence/absence sensing result executed in step S101 is “presence”.

In step S103, if the current result is “presence” (YES), the process advances to step S105 to check whether the access cover 301 was closed immediately before sensing. If the access cover 301 was closed (YES), a CPU 402 determines that the user has opened the access cover 301 and injected ink into the inktank, and the process advances to step S107. In step S107, the counter A is reset to the initial value (the residual quantity is 100%, and the ink liquid surface 205 is at a position F), and count by the counter A is started. On the other hand, if the access cover 301 is not closed immediately before sensing (NO), the CPU 402 determines that air in the inktank 105 has contracted due to a change in the temperature or atmospheric pressure, and the ink liquid surface 205 has risen, and the process advances to step S108. In step S108, the counter B is reset to the initial value (the ink liquid surface 205 is at the position L), and count by the counter B is started.

In step S103, if the current result is “absence” (NO), the CPU 402 determines that the ink in the inktank 105 has been consumed, and the process advances to step S106 to continue count by the counter B.

In step S104, if the current result is "presence" (YES), the process advances to step S109 to continue count by the counter A. On the other hand, if the current result is "absence" (NO), the process advances to step S108 to reset the counter B to the initial value and start count by counter B.

After one of the processes of steps S106 to S109 is executed, in step S110, the current predetermined ink quantity presence/absence sensing result is saved into the NVRAM 405. In step S111, ink residual indication is changed in response to the count value, and the processing is ended.

Figure 7:
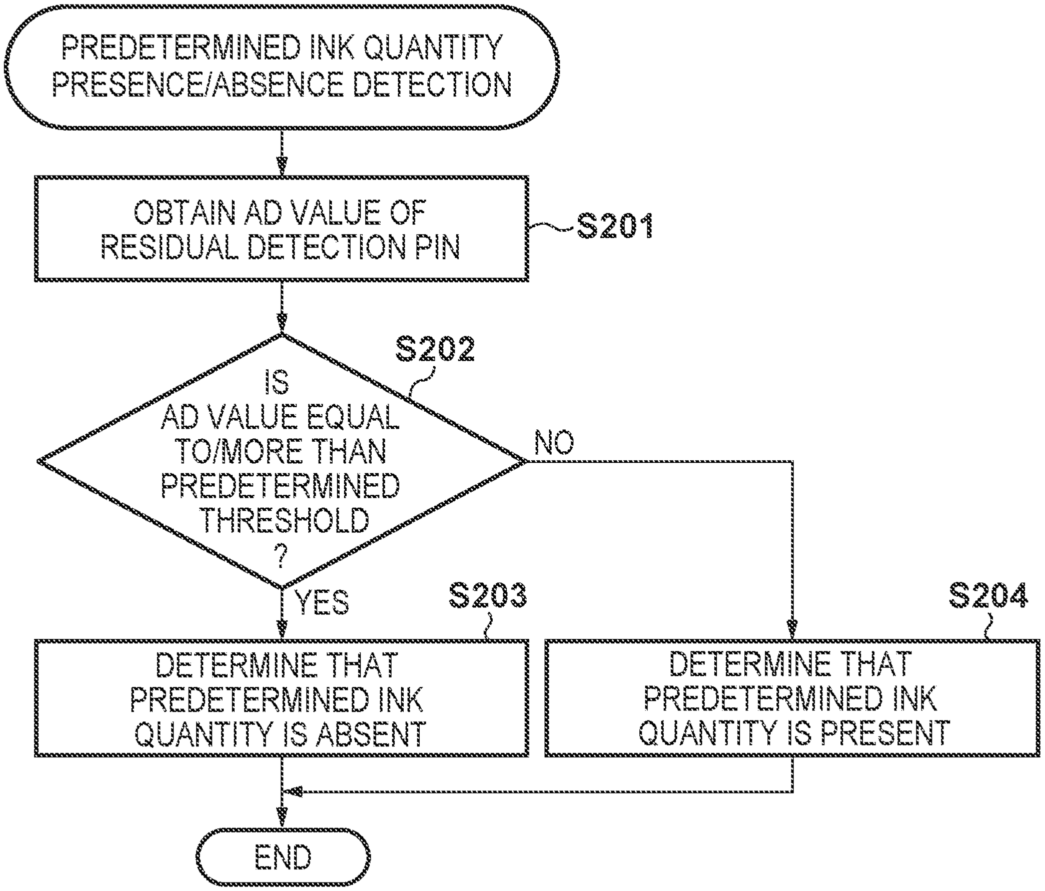
FIG. 7 is a flowchart showing predetermined ink quantity presence/absence detection processing according to the first embodiment.

FIG. 7 is a flowchart showing detailed processing of predetermined ink quantity presence/absence detection shown in step S101 of FIG. 6.

First, in step S201, a digital value (AD value) obtained by detection by the residual detection pins and A/D conversion is obtained. Next, in step S202, it is checked whether the obtained AD value is equal to/more than a threshold (TH).

Here, if the AD value≥TH (YES), the process advances to step S203 to determine that a predetermined ink quantity is "absence". On the other hand, if the AD value<TH (NO), the process advances to step S204 to determine that a predetermined ink quantity is "presence".

Figure 8:
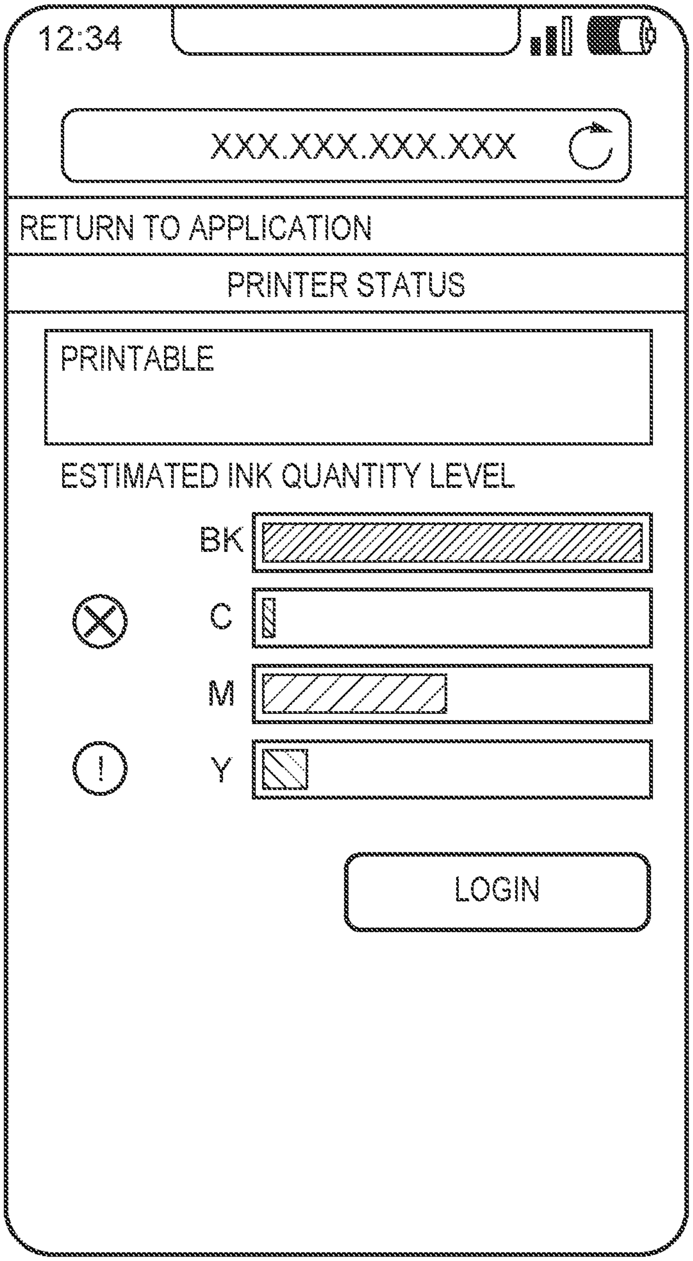
FIG. 8 is a view showing a display screen that displays an ink residual quantity state on a portable device according to the first embodiment.

FIG. 8 is a view showing a display screen of an ink residual quantity displayed on a portable device when the printing apparatus and the portable device serving as a host are connected via the Internet.

FIG. 8 shows a state in which an ink residual quantity is displayed stepwise as an estimated ink quantity level in accordance with a count value. Here, the residual quantity is 100% when the ink liquid surface 205 is at the position F shown in FIG. 3, and 0% at the position E. "BK" represents a state in which a sufficient quantity of black ink exists. At this time, the counter A has the initial value (the residual quantity is 100%), and a rectangular bar indicating the ink residual quantity is colored black. When a state in which the ink is lower than the residual detection pins changes to a state in which the access cover is opened to inject ink into the inktank, and the ink comes into contact with the residual detection pins (step S107), the bar indicating the ink residual quantity changes to a state in which the bar is colored black in step S111. This allows a printing apparatus 10 to notify the user that the residual quantity "has increased".

As described above, the printing apparatus 10 also has a display control function of causing the display screen of a portable device or the like held by the user to display the ink residual quantity. Note that FIG. 8 shows a form in which the ink residual quantity is displayed on the display screen of a mobile phone. However, the form is not limited to this, and the ink residual quantity may be displayed on the display panel of an operation unit 4 of the printing apparatus 10. In addition, not display but a voice or the like may be used to notify the user of the ink residual quantity.

"C" represents that cyan ink may have decreased to the vicinity of the position E, and the "x" mark makes a warning. At this time, the counter B reaches the threshold. "M" represents that a half or more of magenta ink has been consumed, and the half of the bar is colored black. This is a state in which the count value of the counter A has progressed to less than 50% of the whole. "Y" represents that the residual quantity of yellow ink is small. In a state in which the counter B has progressed to an ink quantity less than, for example, 10%, an attention of the user is aroused by an exclamation mark "!".

In this embodiment, ink residual quantity detection is executed at the following timings. That is, the detection is executed:

(a) at the time of soft power-on;
(b) after cover close;
(c) after a cleaning sequence;
(d) immediately after suction recovery by a pump during the cleaning sequence;
(e) before execution of cleaning;
(f) after capping; and
(g) every time a print medium is discharged.

For example, in a state in which the residual sensing result "(f) after capping" is saved as "absence" in the NVRAM 405, the printing apparatus 10 is set in a soft-off state. In the soft-off state (in a hard-on state in which the power supply is connected), when the user opens the access cover 301 to inject ink into the inktank up to the position F and then closes the access cover 301, ink residual detection at the timing (b) cannot be performed because the soft-off state. However, since the sensor of the access cover 301 is operating, "cover close" can be detected. When the user performs soft-on after that, a state of "(a) at the time of soft power-on" is obtained. Hence, ink residual quantity detection is executed. In this case, the sensing result at the timing (f) in the preceding predetermined ink quantity presence/absence detection is "absence", and the sensing result at the timing (a) in the current predetermined ink quantity presence/absence detection is "presence". Furthermore, the cover is closed during soft-off immediately before sensing. Hence, according to the flowchart shown in FIG. 6, in step S107, the counter A is reset to the initial value, and count by the counter A is started.

A case will be examined, in which in a state in which the residual sensing result "(f) after capping" is saved as "absence" in the NVRAM 405, the printing apparatus 10 is set in a soft-off state, the air temperature lowers during soft-off, air in an ink containing chamber 208 contracts, and the ink liquid surface 205 rises. In a case in which the ink liquid surface 205 is higher than the position L, if the user performs soft-on, and ink residual detection is executed, the following processing is performed. That is, the sensing result at the timing (f) in the preceding predetermined ink quantity presence/absence detection is "absence", and the sensing result at the timing (a) in the current predetermined ink quantity presence/absence detection is "presence". Here, close of the access cover 301 is not detected by the sensor immediately before sensing. Hence, according to the flowchart shown in FIG. 6, in step S108, the counter B is reset to the initial value, and count by the counter B is started.

Hence, according to the above-described embodiment, even if the atmospheric pressure or temperature in the inktank changes, the air in the inktank expands/contracts, and the ink level changes although the actual ink quantity does not change, it is possible to suppress the error between the actual ink quantity and the count value.

Second Embodiment

In the first embodiment, two counters A and B are provided to count the consumed ink quantity. An example in which ink residual quantity detection is performed using one counter will be described here.

Figure 9:
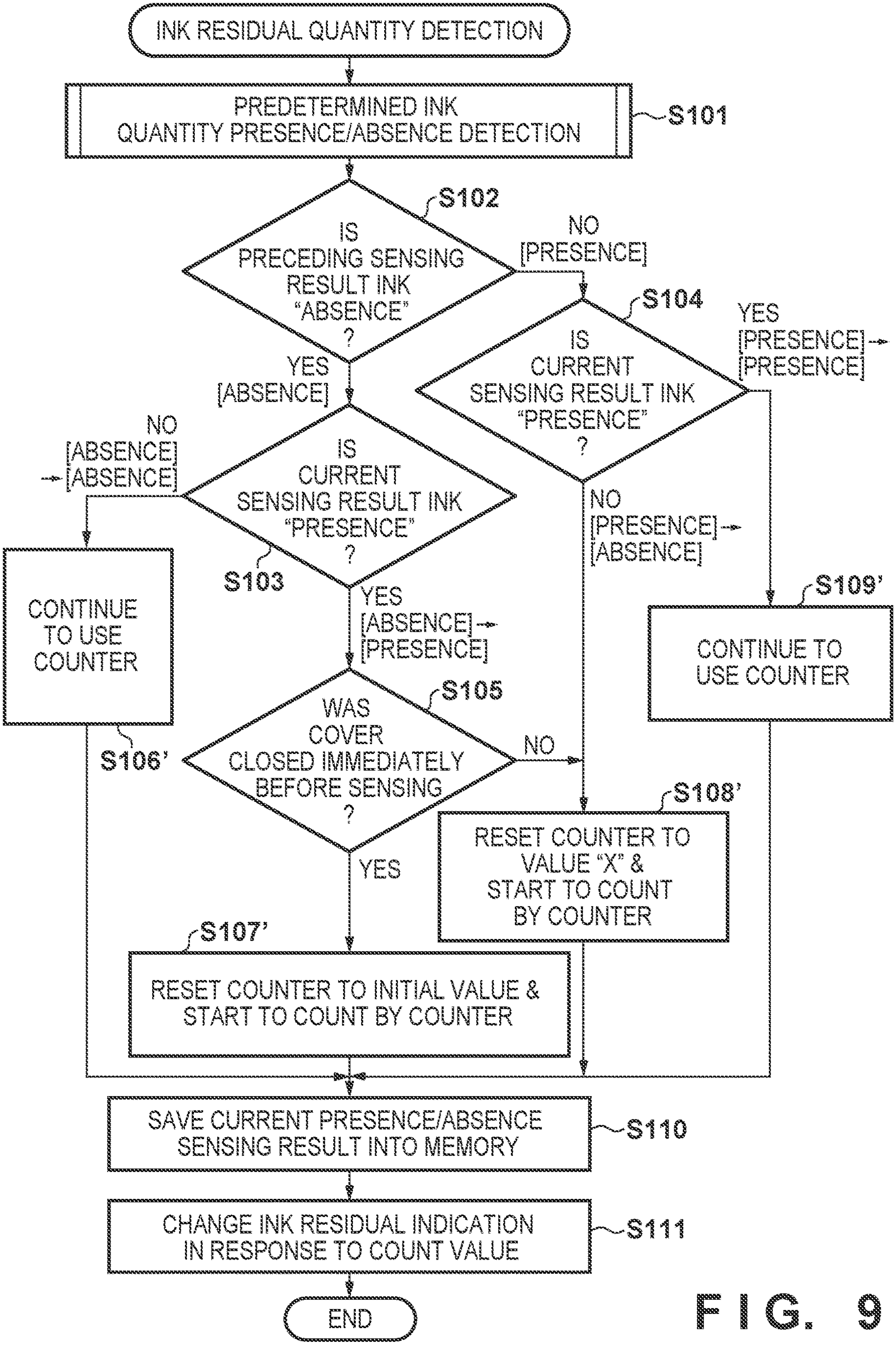
FIG. 9 is a flowchart showing ink residual quantity detection processing according to the second embodiment.

FIG. 9 is a flowchart showing processing of ink residual quantity detection according to the second embodiment. Note that the same step numbers as described in the first embodiment with reference to FIG. 6 denote the same processing steps in FIG. 9, and a description thereof will be omitted. The second embodiment is different from the first embodiment only in that ink residual quantity detection is performed using one counter. Hence, as is apparent from comparison between FIG. 9 and FIG. 6, steps S101 to S105 are similarly executed in the second embodiment as well. As a processing portion for storing an ink residual quantity sensing result in the counter, steps S106' to S109' are executed in the second embodiment in place of steps S106 to S109 in the first embodiment.

That is, if the preceding predetermined ink quantity presence/absence sensing result is "absence", and the current sensing result is "absence", in step S106', count by the counter is continued. If the preceding predetermined ink quantity presence/absence sensing result is "absence", the current sensing result is "presence", and an access cover 301 was closed immediately before sensing, a CPU 402 determines that the user has opened the access cover 301 and injected ink into the inktank. In step S107', the counter is reset to the initial value, and count by the counter is started.

If the preceding predetermined ink quantity presence/absence sensing result is "absence", the current sensing result is "presence", and the access cover 301 was not closed immediately before sensing, the CPU 402 determines that air in the inktank has contracted due to a change in the temperature or atmospheric pressure, and an ink liquid surface 205 has risen. In step S108', the counter is set to a value "X", and count by the counter is started. Here, the count value "X" is a count value corresponding to an ink quantity at a position L in the inktank.

Furthermore, if the preceding predetermined ink quantity presence/absence sensing result is "presence", and the current sensing result is "absence", the CPU 402 determines that the ink has been consumed. In step S108', the counter is set to the value "X", and count by the counter is started.

Finally, if the preceding predetermined ink quantity presence/absence sensing result is "presence", and the current sensing result is "presence", in step S109', count by the counter is continued.

Note that after one of the processes of steps S106' to S109' is executed, steps S110 and S111 are executed, and the processing is ended, as in the first embodiment.

Hence, according to the above-described embodiment, it is possible to detect the accurate ink residual quantity presence/absence as in the first embodiment using one counter.

Third Embodiment

In the first and second embodiments, using a counter configured to count a consumed ink quantity, management is performed based on a count value in both a case in which a predetermined ink quantity is "presence" and a case in which a predetermined ink quantity is "absence". In the third embodiment, an example will be described in which management is not performed based on a count value if a predetermined ink quantity is "presence", and a counter starts count from a state in which an ink liquid surface 205 is lower than a position L, and a predetermined ink quantity is "absence".

Figure 10:
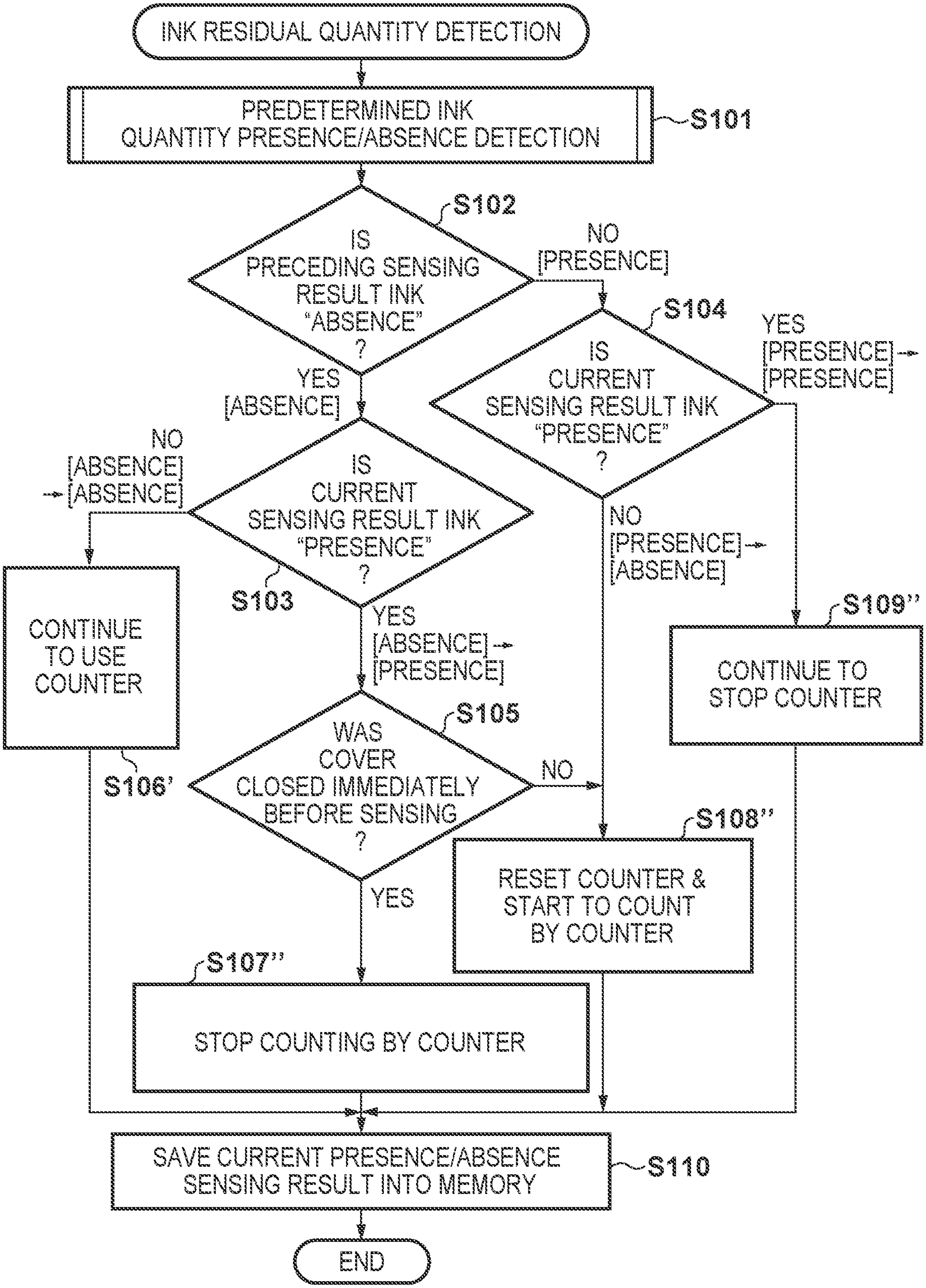
FIG. 10 is a flowchart showing ink residual quantity detection processing according to the third embodiment.

FIG. 10 is a flowchart showing processing of ink residual quantity detection according to the third embodiment. Note that the same step numbers as described in the first and second embodiments with reference to FIGS. 6 and 9 denote the same processing steps in FIG. 10, and a description thereof will be omitted.

As is apparent from comparison between FIG. 10 and FIGS. 6 and 9, steps S101 to S105 are similarly executed in the third embodiment as well. As a processing portion for storing an ink residual quantity sensing result in the counter, steps S107" to S109" are executed in the third embodiment in place of steps S107' to S109' in the second embodiment.

If the preceding predetermined ink quantity presence/absence sensing result is "absence", the current sensing result is "presence", and an access cover 301 was closed immediately before sensing, a CPU 402 determines that the user has opened the access cover 301 and injected ink into the inktank. In step S107", count by the counter is stopped.

If the preceding predetermined ink quantity presence/absence sensing result is "absence", the current sensing result is "presence", and the access cover 301 was not closed immediately before sensing, the CPU 402 determines that air in the inktank has contracted due to a change in the temperature or atmospheric pressure, and the ink liquid surface 205 has risen. In step S108", the counter is reset to the initial value, and count by the counter is started.

Furthermore, if the preceding predetermined ink quantity presence/absence sensing result is "presence", and the current sensing result is "absence", the CPU 402 determines that the ink has been consumed. In step S108", the counter is reset to the initial value, and count by the counter is started.

Note that the initial value mentioned in step S108" indicates a count value representing a state in which the ink liquid surface 205 is located at the position L, unlike the initial value mentioned in the first and second embodiments.

Finally, if the preceding predetermined ink quantity presence/absence sensing result is "presence", and the current sensing result is "presence", in step S109", count by the counter is kept stopped.

Note that after one of the processes of steps S106' and S107" to S109" is executed, step S110 is executed, and the processing is ended, as in the first embodiment.

Note that in this embodiment, since the counter operates only after the ink liquid surface 205 is located under the position L corresponding to the lower end portions of residual detection pins, synchronization with a residual indication bar as shown in FIG. 8 is not performed. If it is determined based on the count result by the counter that the ink liquid surface 205 may have lowered to the vicinity of a position E, a "x" mark is displayed on, for example, an ink indication screen of a portable device or a display panel of a printing apparatus. This warns the user that the ink residual quantity is small.

Hence, according to the above-described embodiment, for example, it is possible to use one counter as in the second embodiment and detect the accurate ink residual quantity presence/absence as in the first embodiment while decreasing the number of count processes.

According to the above-described embodiments, the transition between the result of predetermined ink quantity presence/absence detection executed at a certain timing and the result of detection executed at a timing immediately before the detection is verified. If it is determined that a change from a state in which a predetermined ink residual quantity is "absence" to a state in which a predetermined ink quantity is "presence" has occurred, and ink injection was possible immediately before the detection, it is determined to do ink injection, and control is performed to initialize the count value and return the count to an ink filled-up state. This can suppress the error between the actual ink quantity and the count value.

Note that in the above-described embodiments, to determine whether ink injection from the inlet port is possible, a sensor that detects open/close of the access cover is used.

However, the present invention is not limited to this. For example, sensors that detect open/close of the first cover 109 and the second cover 110 used to cover the inlet ports of the inktanks may be used, or a sensor that directly detects open/close of the tank cap for the inlet port may be used.

In the above-described embodiments, a pair of electrode pins are used to detect predetermined ink quantity presence/absence. However, the present invention is not limited to this. For example, an optical method of detecting the liquid level of ink from a reflected state of a light beam by an optical sensor and a prism may be used. Any other detection method can be used as long as it is possible to detect the liquid level position in a state in which a predetermined ink quantity remains in the inktank.

Furthermore, in the above-described embodiments, an example in which the ink residual quantity is displayed stepwise on the display screen to improve visibility for the user has been described. However, stepwise display need not always be performed. Warning display may be done when the ink residual quantity becomes a predetermined criterion or less.

Also, in the above-described embodiments, as the timing of executing ink residual quantity detection, the seven timings (a) to (g) are used. However, the timings are not limited the above seven timings. For example, residual quantity detection need only be executable before and after an event that consumes ink, and may be performed during a printing operation.

In addition, the present invention is applicable not only to an inkjet printing apparatus having a single function but also to a facsimile apparatus, a copying machine, a word processor, or a multifunction peripheral using the inkjet printing apparatus as a print unit. Furthermore, the printing apparatus may use not only a serial method of scanning a printhead on a print medium and conveying the print medium in a direction orthogonal to a scan direction to perform printing but also a method of performing printing only by conveying a print medium using a full-line printhead having a print width corresponding to the width of the print medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073081, filed Apr. 5, 2019, which is hereby incorporated by reference herein in its entirety.

What is claimed is:

1. A system comprising a printing apparatus and a mobile phone, the printing apparatus comprising:

a plurality of tanks corresponding to a plurality of colors of ink, wherein each tank includes an inlet port detachably capped by a cap, and is configured to contain ink of the corresponding color which is injected through the inlet port;

a printhead configured to discharge, to a print medium, ink supplied from the plurality of tanks; and a pair of electrodes configured to detect, for each color, whether the corresponding tank contains a predetermined quantity of ink, and the mobile phone comprising a screen for displaying:

a plurality of bars indicating, for each color, an estimated quantity of ink in the corresponding tank based on a detection result of the pair of electrodes; and a text string indicating whether the printing apparatus is capable of printing, wherein for each color, the estimated quantity of ink in the corresponding tank changes based on consumption of the ink, and on the screen, the plurality of bars are displayed to be arranged in one direction with the text string being displayed at an upper side of the plurality of bars.

2. The system according to claim 1, wherein on the screen, in a case in which the estimated quantity of ink in the corresponding tank is less than 50% of the capacity, an exclamation mark is displayed with regard to the corresponding bar.

3. The system according to claim 2, wherein on the screen, in a case in which the estimated quantity of ink in the corresponding tank is less than 10% of the capacity, the exclamation mark is displayed with regard to the corresponding bar.

4. The system according to claim 2, wherein on the screen, in a case in which the estimated quantity of ink in the corresponding tank is less than 1% of the capacity, a mark differing from the exclamation mark is displayed with regard to the corresponding bar.

5. The system according to claim 1, wherein one of the plurality of bars is a first bar indicating the reference of the quantity of black ink, the first bar being displayed in black color.

6. The system according to claim 1, wherein the pair of electrodes performs the detection in a case in which the printing apparatus is switched to a power-on state.

7. The system according to claim 1, further comprising an obtaining unit configured to obtain, for each color, information on a consumption of ink after the pair of electrodes detects that the corresponding tank does not contain the predetermined quantity of ink, wherein on the screen, for each color, information on the quantity of ink in the corresponding tank is displayed based on the information obtained by the obtaining unit.

8. The system according to claim 1, further comprising a cover configured to cover each of the inlet ports.

9. The system according to claim 1, further comprising a carriage configured to mount the printhead and to move in a predetermined direction.

10. The system according to claim 9, wherein the plurality of tanks are arranged in the predetermined direction.

11. The system according to claim 1, further comprising:

a first channel configured to allow ink to flow from a bottle to each tank; and a second channel configured to allow air to flow from each tank to the bottle.

12. The system according to claim 1, wherein the estimated quantity of ink changes based on consumption of the ink while the pair of electrodes detects that the corresponding tank contains the predetermined quantity of ink, and the estimated quantity of ink changes based on the detection result after the pair of electrodes detects that the corresponding tank does not contain the predetermined quantity of ink.

* * * * *